(12) United States Patent
Harshe et al.

(10) Patent No.: US 9,670,328 B2
(45) Date of Patent: Jun. 6, 2017

(54) EPOXY RESIN FORMULATION FOR LARGE AND THICK COMPOSITE STRUCTURES

(71) Applicant: DIRECTOR GENERAL, DEFENCE RESEARCH & DEVELOPMENT ORGANIZATION [DRDO], New Delhi (IN)

(72) Inventors: Rahul Harshe, Maharashtra (IN); Ranjith Kottot, Maharashtra (IN); Anoop Anand, Maharashtra (IN); Makarand Joshi, Maharashtra (IN)

(73) Assignee: DIRECTOR GENERAL, DEFENCE RESEARCH & DEVELOPMENT ORGANIZATION [DRDO] (IN)

( * ) Notice: Subject to any disclaimer, the term of this patent is extended or adjusted under 35 U.S.C. 154(b) by 26 days.

(21) Appl. No.: 14/431,039

(22) PCT Filed: Mar. 26, 2013

(86) PCT No.: PCT/IN2013/000198
§ 371 (c)(1),
(2) Date: Mar. 25, 2015

(87) PCT Pub. No.: WO2014/049602
PCT Pub. Date: Apr. 3, 2014

(65) Prior Publication Data
US 2015/0274902 A1  Oct. 1, 2015

(30) Foreign Application Priority Data

Sep. 28, 2012  (IN) .................. 2864/MUM/2012

(51) Int. Cl.
| | | |
|---|---|---|
| *B32B 27/04* | (2006.01) | |
| *B32B 27/26* | (2006.01) | |
| *B32B 27/38* | (2006.01) | |
| *C08G 59/50* | (2006.01) | |
| *C08L 63/00* | (2006.01) | |
| *C08J 5/24* | (2006.01) | |
| *C08J 5/04* | (2006.01) | |
| *C08G 59/24* | (2006.01) | |
| *C08G 59/68* | (2006.01) | |

(52) U.S. Cl.
CPC ............ *C08J 5/043* (2013.01); *C08G 59/245* (2013.01); *C08G 59/50* (2013.01); *C08G 59/5033* (2013.01); *C08G 59/686* (2013.01); *C08J 2363/02* (2013.01)

(58) Field of Classification Search
CPC . C08J 5/24; C08L 63/00; C08G 59/50; C08G 59/5006; C08G 59/5026; C08G 59/5033; B32B 27/04; B32B 27/26; B32B 27/38
USPC ............... 523/427, 428, 461; 428/297.4, 413
See application file for complete search history.

(56) References Cited

U.S. PATENT DOCUMENTS

| | | | | |
|---|---|---|---|---|
| 3,728,425 | A | * | 4/1973 | Schrader .............. B01D 63/023 106/171.1 |
| 5,091,216 | A | * | 2/1992 | Ekiner ................. B01D 69/125 427/243 |
| 6,355,763 | B1 | | 3/2002 | Scherzer et al. |
| 6,465,601 | B1 | | 10/2002 | Wiesendanger et al. |

OTHER PUBLICATIONS

Technical Data Bulletin for EPON Resin 828, provided by Hexion Specialty Chemicals (2005).*
Registry Data for 1966950-32-2 and 1966949-81-4, provided by STN (no date).*
Registry Data for 111-33-1, provided by STN (no date).*
Registry Data for 109-55-7, provided by STN (no date).*
International Search Report issued in corresponding application No. PCT/IN2013/000198 on Mar. 3, 2014.

* cited by examiner

*Primary Examiner* — Michael J Feely
(74) *Attorney, Agent, or Firm* — Whiteford, Taylor & Preston, LLP; Peter J. Davis (57) ABSTRACT

In the present disclosure!, there is disclosed an epoxy resin formulation for the manufacturing of large and thick composite structures, said formulation comprising i) at least one epoxy resin in a weight proportion varying between 50 parts to 70 parts; (ii) at least one hardening agent in a weight proportion varying between 21 phr to 29 phr; (iii) at least one diluent in a weight proportion varying between 10 phr to 40 phr; and (iv) N,N'dimethylaminopropylamine as an accelerator in a weight proportion varying between 0.5 phr to 3.0 phr. The formulation is used in the manufacturing of large and thick composite structures by employing Vacuum Assisted Resin Transfer Molding Process.

12 Claims, 5 Drawing Sheets

EPOXY RESIN FORMULATION FOR LARGE AND THICK COMPOSITE STRUCTURES

FIELD OF DISCLOSURE

The present disclosure relates to a thermoset resin formulation. More particularly, the present disclosure relates to a thermoset resin formulation for use in the manufacturing of composites for high end structural engineering applications.

BACKGROUND

"Composite materials" constitute one of the categories of advanced materials and defined as materials composed of two or more distinctly identifiable constituents. In composite materials, one material serves as a matrix, whereas another material serves as a reinforcement. Composites are generally more mechanically strong, light weight, corrosion resistant and dimensionally stable in comparison to their conventional counterparts, and used in a growing number of industries.

Fiber reinforced thermoset polymer composites are widely employed composite materials for research and development in structural engineering, predominantly in the high profile structural engineering industries such as aviation, military, space shuttle manufacturing and the like. Unidirectional fabric reinforced thermoset composites are examples of thermoset composites finding extensive load bearing applications in virtually all sectors of military engineering such as military bridging, naval structures, light weight combat aircrafts and the like.

Manufacturing of large and thick composite structures for structural applications is carried out by processes such as Vacuum Assisted Resin Transfer Molding (VARTM). In this process, fabric is stacked on the mould, sealed with vacuum bag and the resin is driven into the system by vacuum. In recent years this method has widely been used to develop load bearing fiber reinforced polymer composites.

The polymer resin being driven by vacuum undergoes a global flow from the resin source towards the vacuum line. Therefore, the processability of the resin is a critical factor as far as the infusion through thicker layers of fabric, under the application of vacuum is concerned. While fabricating large and thick composite structures by the VARTM process, there are certain issues to be taken care of such as application of proper magnitude of vacuum, ensuring zero leakage, proper positioning of vacuum lines and resin lines, and the distribution of resin flow and permeability.

Apart from foregoing essential requirements, certain stringent characteristics of the polymer resin are also required for this infusion technique. The polymer system as employed in the preparation of reinforced polymer composites serves two primary functions (a) to distribute the stress between fibers for structural efficiency and (b) to rigidize the structure to provide mechanical utility. It also determines many secondary functions such as electrical resistance and fire resistance which contribute to the ultimate utility of product. Viscosity of the liquid resin and its rate of conversion to a solid mass especially during the fabrication of large and thick composite structures through the VARTM process are also relevant from a processing point of view. The exothermic nature of the epoxy's cure reaction further presents challenges with regard to the control of the whole process carried out on a large scale. Apart from the viscosity and other characteristic features, the VARTM process also demands ideal gelation conditions for the resin.

Structural composites developed for military applications use unidirectional glass or carbon fabric. Other than the viscosity and the reactivity profile of the resin formulation, permeability of the reinforcing fabric and distribution of resin through it (which ultimately determines the extent of resin saturation) also determines the infusion temperature, infusion time, holding time, and vacuum applications. Low permeability of unidirectional fabric causes difficult infusion of the polymer resin mix through the fabric.

Existing Knowledge:

A commercially available resin formulation that is used in the manufacture of large and thick composite structures is Diglycidyl Ether of Bisphenol A (DGEBA) based epoxy resin (Araldite LY1564) with an amine hardener (Aradur 3486) from Huntsman ltd. At a proportion of 100:34, this resin-hardener mixture has an initial viscosity of 200 cps at 25° C. Cross-linking of the aliphatic amine hardener with epoxy resin at faster rate tremendously increases the viscosity of the system. The increased viscosity makes infusion of thick and large structures difficult and in worst case leads to cure loss and heavy financial non-recoverable loss. This also leads to formation of dry patches in composite structures, which might cause a catastrophic failure under load. Further, the cross-linking of DGEBA based epoxy resin and amine hardener produces substantial exotherm which contributes to the threshold to provide exponential hike in viscosity in a short duration.

Considering the above described hurdles encountered during processing of a resin formulation while preparing a composite structure for high end structural engineering applications, an improved matrix formulation with appropriate processing characteristics as an alternative to the commercially available ones is highly desirable.

Objects:

Some of the objects of the present disclosure are described herein below:

It is an object of the present disclosure to ameliorate one or more problems of the prior art or to at least provide a useful alternative.

Another object of the present disclosure is to provide a thermoset resin formulation for the fabrication of large and thick composite structures.

Still another object of the present disclosure is to provide a thermoset resin formulation with improved/optimized processing characteristics that include a low viscosity and a tuned reactivity profile.

Yet another object of the present disclosure is to provide a thermoset resin formulation having ideal gelation conditions.

Further object of the present disclosure is to provide a thermoset resin formulation wherein curing/post curing of the resin formulation is feasible within a stipulated period of time to result in a high glass transition temperature.

Still a further object of the present disclosure is to provide a thermoset resin formulation wherein preparation of large and thick composite structures employing the resin formulation is carried out under thermally sustained conditions.

A further object of the present invention is to provide large and thick composite structures with excellent mechanical properties.

Other objects and advantages of the present invention will be more apparent from the following description when read in conjunction with the accompanying figures, which are not intended to limit the scope of the present invention.

DEFINITION

As used herein the term "composite" or "composite structures" refers to a material comprising polymer matrix reinforced with fabric or fiber.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elenients or ingredients or quantities, as the use may be in the embodiment of the invention to achieve one or more of the desired objects or results.

SUMMARY

In accordance with the present invention there is provided a thermoset resin formulation for the manufacture of large and thick composite structures; said formulation comprising (i) at least one epoxy resin in a weight proportion varying between 50 parts to 70 parts; (ii) at least one aromatic di-amine compound as a hardening agent in a weight proportion varying between 21 to 29 parts per hundred parts of resin; (iii) at least one diluent in a weight proportion varying between 10 to 40 parts per hundred parts of resin; and (iv) N,N-dimethylaminopropylamine as an accelerator in a weight proportion varying between 0.5 to 3.0 parts per hundred parts of resin (hereinafter refer as phr).

Typically, the epoxy resin is Diglycidyl Ether of Bisphenol-A epoxy resin having viscosity varying between 9500 to 12500 cps, at 25° C. and density varying in the range of 1.1 $g/cm^3$ to 1.2 $g/cm^3$.

Typically, the weight proportion of Diglycidyl Ether of Bisphenol-A epoxy resin is 60 phr.

Typically, the hardening agent is a di-amine compound that comprises at least one agent selected from the group consisting of isophorone diamine, 2,2'-dimethyl-4,4'methylene bis(cyclohexyl amine) and diethyl toluene diamine.

Typically, the hardening agent is present in a weight proportion of 23 phr.

Typically, the diluent is low molecular weight epoxy resin that includes at least one compound selected from the group consisting of diglycidyl ether of butane diol, diglycidyl ether of hexane diol, epofine and epoxidised cashew nut shell liquid.

Preferably, the diluent is diglycidyl ether of butane diol.

Typically, the weight proportion of the diluent is 40 phr.

Typically, the accelerator is present in a weight proportion of 1.1 phr.

Typically, the thermoset resin formulation is characterized by having a viscosity of about 260 cps at 25° C. and a glass transition temperature of about 104° C.

In accordance with the present invention, there is provided a composite structure comprising a thermoset resin formulation of the present disclosure in an amount ranging between 40 wt % to 50 wt %, reinforced with at least one reinforcing agent in an amount varying between, 60 wt % to 50 wt %.

Typically, the reinforcing agent is a unidirectional fabric selected from the group of fabrics consisting of E-glass fiber, carbon fibers and any combinations thereof.

In accordance with the present disclosure, there is provided a process for manufacturing a composite structure using the thermoset resin formulation of the present disclosure, said process comprising the following steps;
i. stacking the layers of a reinforcing agent on a mould and sealing with vacuum;
ii. infusing the thermoset resin formulation through the stacked layers of reinforcing agent under vacuum; and
iii. curing the stacked layers infused with the resin at a temperature varying between 25 to 45° C. for a time period of about 24 hours, followed by post curing at a temperature of 120° C. for a time period of about 8 hours to obtain composite structure.

DETAILED DESCRIPTION

The present disclosure is accomplished taking into account the above described goals and objects of the present disclosure.

Accordingly, the present disclosure envisages a thermoset resin formulation with optimized processing characteristics for the manufacture of large and thick composite structures wherein the limitations allied with conventional resin formulations are successfully alleviated.

In a first aspect of the present disclosure, there is provided a thermoset resin formulation with optimized processing characteristics for the manufacture of large and thick composite structures.

The optimized processing characteristics desired in the resin formulation of the present disclosure include low viscosity, high glass transition temperature, tuned reactivity profile and ideal gelation conditions wherein curing/post curing of the resin formulation within a stipulated period of time is feasible. With the optimized resin formulation, prolonged working time, usually 10 hrs or more is attained which is quite viable for any trouble shooting required while preparing large structural composites.

The thermoset resin formulation with optimized processing characteristics according to the present disclosure comprises at least one thermoset resin matrix admixed with at least one hardening agent, at least one diluent and at least one accelerator.

The thermoset resin matrix present in the resin formulation of the present disclosure is typically a bisphenol A based epoxy resin produced by glycidylation of bisphenols.

In accordance with one of the exemplary embodiments of the present invention, Bisphenol-A diglycidyl ether is the preferred epoxy resin. The Bisphenol-A diglycidyl ether resin as employed for the purpose of the present disclosure is procured readymade with Trade Name of Araldite GY 250 having the following structural formula:

The Araldite GY 250 epoxy resin is liquid at room temperature having a viscosity of 9500 to 12500 cps at 25° C. and density of 1.14 to 1.2 g/cm³.

In accordance with the present invention, weight proportion of the epoxy resin present in the optimized resin formulation varies between 50 parts to 70 parts.

In accordance with one of the embodiments of the present invention, the preferred weight proportion of the epoxy resin is 60 parts.

The thermoset resin formulation of the present disclosure further comprises at least one hardening agent. The hardening agent present in the resin formulation according to the present disclosure is typically a di-amine compound.

In accordance with the present disclosure, at least one di-amine compound present in the thermoset resin formulation is selected from the group consisting of Isophorone diamine, 2,2'-dimethyl 4,4'-methylene bis(cyclohexyl amine) and diethyl toluene diamine (DETDA).

Among different diamine compounds, the aromatic diamine compounds are preferred over the aliphatic di-amine compounds because they provide a resin formulation with certain enhanced features such as development of higher heat distortion temperature in the cured products, longer pot life of mixtures and greater chemical resistance after, cure. Aromatic diamine compounds impart higher chemical resistance properties to epoxy resin, as compared to aliphatic diamines.

The hardening agent and the epoxy resin are present in stoichiometric amounts. The amount of the hardening agent mixed with the epoxy resin is calculated based on the epoxy equivalent weight of the resin. In accordance with the present disclosure, the weight proportion of the hardening agent present in the thermoset resin formulation varies between 21 and 29 phr.

In accordance with one of the embodiments of the present disclosure, the weight percentage of the hardening agent varies between 21 phr to 29 phr. The preferred weight proportion of the hardening agent is 23 phr.

The epoxy resin and the hardening agent are mixed in a pre-determined stoichiometric ratio to obtain a first reaction mixture. The first reaction mixture comprising epoxy based resin matrix admixed with at least one hardening agent shows a relative high viscosity. To control the viscosity of the first reaction mixture to a desired level, further addition of diluents is required.

Different diluents and their concentrations are optimized in the present disclosure depending on the desired viscosity and thermal properties of the resin formulation. The diluents suitable for the thermoset resin formulation of the present disclosure are low molecular weight epoxies. Considerable efforts have been expended in understanding the effect of low molecular weight epoxies on reducing the viscosity of the resin formulation, hence to achieve ease of processing are accomplished by the present inventors.

The first reaction mixture comprising the epoxy based resin matrix and hardening agent is further mixed with a pre-determined weight proportion of diluent to obtain a second reaction mixture.

In accordance with the present disclosure, the diluent is at least one selected from the group consisting of diglycidyl ether of butane diol, diglycidyl ether of hexane diol, epofine and epoxidized cashew nut shell liquid.

Among different diluents tested so far, the significant results in terms of attaining the thermoset formulation with low or optimized viscosity are achieved in case of diglycidyl ether of butane diol or epofine.

In accordance with one of the embodiments of the present invention, the diluent is diglycidyl ether of butane diol.

In accordance with another embodiment of the present disclosure, the diluent is epofine.

Other than the diluents, their weight proportions are also optimized in the present disclosure. In accordance with the present disclosure, the weight proportion of the diluent present in the thermoset resin formulation varies in the range of 10 phr to 40 phr.

The second reaction mixture containing the epoxy based resin, the hardening agent and the diluent is further analyzed for its viscosity profile. The inventors of the present invention have successfully analyzed the desired viscosity of the second reaction mixture which is however not achieved at the lower concentration of the diluents. In accordance with one of the embodiments of the present disclosure, the weight proportion of diglycidyl ether of butane-diol diluent present in the thermoset resin formulation is 40 phr.

Apart from studying the effect of diluents on the viscosity of the resin formulation, their effect on the glass transition temperature of the resin formulation is also studied by the present inventors. In case of epofine and diglycedyl ether of butane diol based diluents, substantial high glass transition temperature of the resin formulation is achieved.

The reaction mixture comprising at least one epoxy based resin matrix, at least one hardening agent and at least one diluent in accordance with the present disclosure possesses optimized low viscosity and high glass transition temperature. The high glass temperature of the second reaction mixture is about 103° C. However, the high glass transition temperature of about 103° C. is not considered feasible for the purpose of curing/post curing of the resin formulation as the high glass transition temperature 103° C. requires a curing temperature of 120° C. for a prolonged time period of about 16 hrs. Additionally, a longer pot life prevents its, gelation and conversion to a hard mass in stipulated time. To further tune the reactivity profile and glass transition temperature of the reaction mixture comprising at least one epoxy based resin, at least one hardening agent and at least one diluent in accordance with the present invention, the use of further additive which accelerates the cross-linking reaction is found desirable.

For this purpose, various accelerators at different weight proportions were tested for improving the gelation condition of the reaction mixture, in accordance with the present disclosure. The second reaction mixture comprising epoxy based resin matrix, hardening agent and diluent is further mixed with an accelerator to provide a thermoset resin formulation.

The accelerator as used in the present disclosure is typically an aliphatic amine based that includes at least one selected from the group consisting of N,N'-diethyl ethylene diamine, N,N'-dimethyl ethylene diamine, N,N'-dibutyl propylene diamine, N,N'dimethyl propylene diamine, N,N-dimethylaminopropyl amine, N,N'-diethyl propylene diamine, 3-dibutylaminopropyiamine. The preferred accelerator is N,N-dimethyl aminopropylamine.

The weight ratio of the accelerator as used in the thermoset resin formulation of the present disclosure typically varies between 0.5 phr to 3.0 phr. The preferred amount is 1.1 phr.

The thermoset resin formulation in accordance with the present disclosure comprising at least one epoxy based resin, at least one hardening agent, at least one accelerator and at least one diluent is prepared by using conventional mixing methods. Ingredients are mixed together at ambient conditions. Though, there is no specific order in which different ingredients are admixed, the ingredients are preferably mixed in the order of diluent-hardener-accelerator by mechanical means in the epoxy resin. After ensuring a uniform mixing, the mixture is degassed and subjected to viscosity and reactivity characterization within stipulated time of 10 minutes.

The thermoset resin formulation in accordance with the present disclosure offers an ideal matrix formulation for composites to be fabricated by Vacuum Assisted. Resin Transfer Molding (VARTM). It offers an adequate viscosity profile, required trend in reactivity and ideal gelation conditions.

In accordance with another aspect of the present invention there is provided a thick composite structure comprising the thermoset resin formulation of the present disclosure reinforced with at least one uni-directional fabric.

In accordance with the present disclosure, the unidirectional fabric present in the thick composite structure is at least one selected from the group consisting of E-glass fabric and carbon fabric.

The unidirectional E-glass fabric with 500 gsm aerial density and with >99% fiber oriented in warp direction is a suitable reinforcing-agent for the purpose of the present disclosure.

The composite structure comprising the thermoset resin formulation of the present invention reinforced with unidirectional fabric is prepared by employing the VARTM process.

The versatility of the new thermoset resin formulation is tested with the fabrication of 'L'-shaped thick composite specimen, with embedded sensors that monitor the extent of exotherm. The unidirectional E-glass reinforced composite after infusion is left for curing at 40° C. for 24 hrs. This duration is optimized based on the gelation of epoxy resin with the hardening agent-accelerator-diluent system. The composite is further subjected to post curing at 120° C. for 8 hrs resulting in mechanically robust structures. The amount of heat generated from the composite during the cure-reaction at 40° C. is recorded by means of embedded sensors. The difference in temperatures with time, which is a direct measure of the exotherm is found negligible. The initial hike in the temperature difference is only due to the attainment of the set temperatures. The trend remains the same even during the post curing cycle at an elevated temperature. This observation is rather very promising and has wide-spreading implications. One of the most critical issues i.e., the evolution of tremendous amount of heat energy, which remains challenging in conventional epoxy resin formulations especially while dealing with bulk quantities is thus solved in the thermoset resin formulation of the present disclosure.

The epoxy resin formulation with required viscosity characteristics, desirable reactivity profile and feasible cure cycle is developed to be used for processing techniques such as vacuum assisted resin transfer molding. This is an ideal matrix system with the required thermal and mechanical properties for the manufacture of large and thick fiber reinforced structural composites, more specifically for military applications.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended Merely to facilitate an understanding of ways in which the embodiments herein may be, practiced and to further enable those of skill in the art to practice the embodiments herein. Accordingly, the examples should not be construed as limiting the scope of the embodiments herein.

Example-1

This example describes the optimized thermoset resin formulation and cure cycle.

The optimized thermoset resin formulation to yield the right viscosity, desired reactivity profile and feasible curing cycle to be used for Vacuum Assisted Resin Transfer Molding process for the fabrication of thick and large structures was prepared by mixing the ingredients as described in Table-1. The ingredients were mixed in an order of diluent-hardener-accelerator in the epoxy resin by mechanical means. After ensuring a uniform mixing, the reaction mixture was degassed and was subjected to viscosity and reactivity characterization within a stipulated time of 10 min and was used for subsequent sample preparations.

TABLE 1

Optimized thermoset resin formulation.

| Ingredients | Source | Function | Concentration (phr) |
|---|---|---|---|
| DGEBA based epoxy (GY250) | Huntsman | Base resin | 60 |
| Diglycidyl ether of butane diol (DYD-) | Huntsman | Diluent | 40 |
| Diethyl Toluene Diamine (DETDA) | Fine Finish | Hardener | 23 |
| N,N-dimethylaminopropylamine | Aldrich | Accelerator | 1.1 |

Cure cycle: Room temperature for 24 hours followed by 120° C. for 8 hours.

Figure 2:
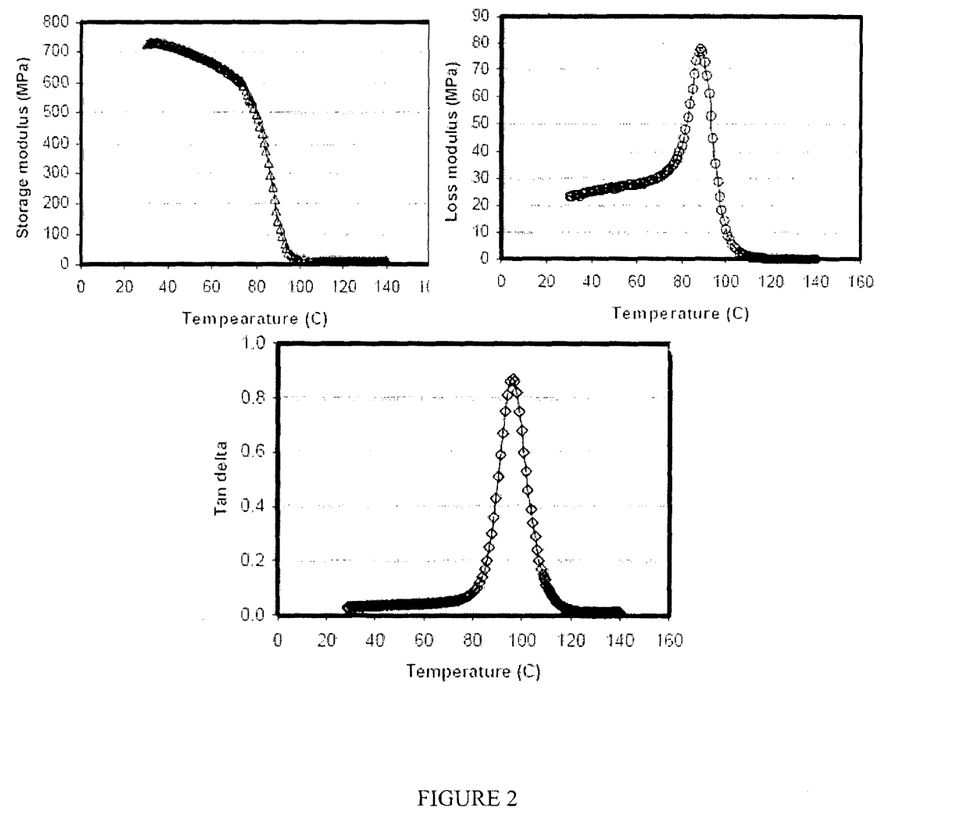
FIG. 2 depicts the dynamic mechanical properties of cured epoxy resin, in accordance with the present disclosure.

Further, viscoelastic properties of the cured thermoset resin formulation were also studied by the present inventors using a dynamic mechanical analyzer. The variation in dynamic modulii with temperature is depicted in FIG. 2 of the accompanying drawings. The glass transition temperature re was also evaluated from the peak of the tan δ curve.

Viscosity measurements of each of the reaction mixtures including the optimized thermoset resin formulation was determined by using a rheometer from Reologica instruments. Cup and bob geometry was used at shear rate of 25 sec$^{-1}$.

Dynamic Mechanical Analyser (DMA, Reologica instruments) is also used for $T_g$ determination. Rectangular specimens of dimensions 30×10×3 mm were subjected to mechanical deformations at a strain rate of 0.1% and at a frequency of 1 Hz over a temperature range of 25-150° C.

Example 2

This example describes the effect of temperature on the viscosity of the thermoset resin formulation of example-1

Figure 3:
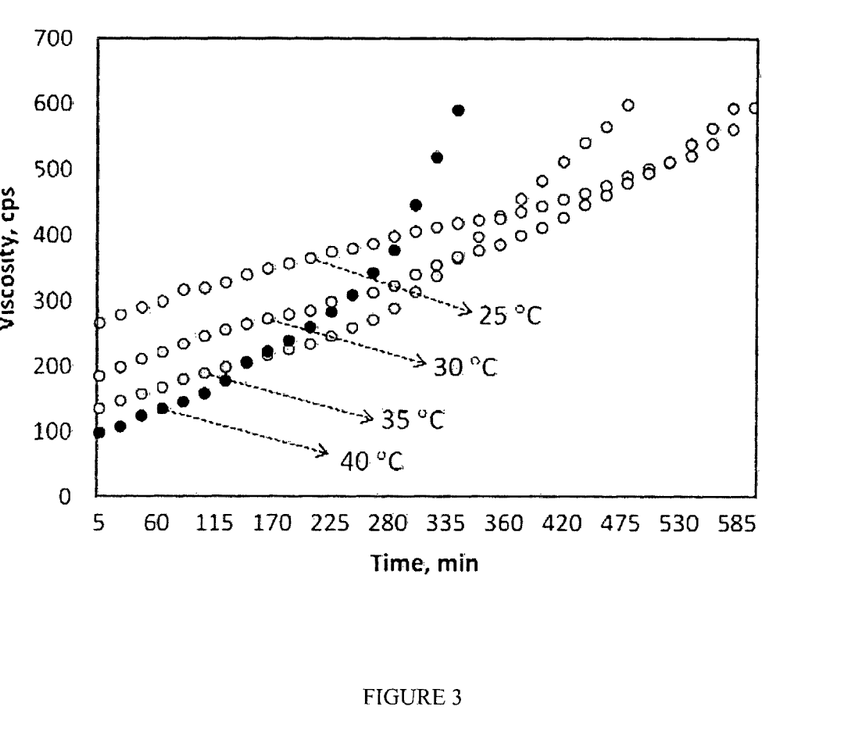
FIG. 3 of the present disclosure illustrates effect of temperature on the reactivity profile of the thermoset resin formulation comprising GY250 epoxy resin, diethylene toluene diamine (DETDA) hardening agent, DYD diluent and N,N-dimethylaminopropvlamine accelerator.

The reduction in initial viscosity (when the temperature is increased from 25 to 40° C.) of the resin mix with temperature was very well expected. However, the slope of the viscosity vs. time plots at various temperatures (refer to FIG. 3 of the accompanying drawings) is remaining unaltered and is an indication of the unaffected reactivity of the formulations with temperature. This unchanged reactivity of the resin mix even when the temperature of isothermal experiments varied from 25 to 40° C. is the most desirable aspect of the present disclosure. This indicates that the infusion of thermoset resin formulation is feasible at a broad range of temperatures without any concerns of gelling during the course of the infusion process.

Example-3

This example describes a process for the preparation of composite structures derived from the thermoset resin formulation of example-1. The versatility of the new resin formulation as described in example-1 was further tested with the fabrication of an shaped thick composite specimen, with embedded sensors that monitored the extent of exotherm.

Figure 1:
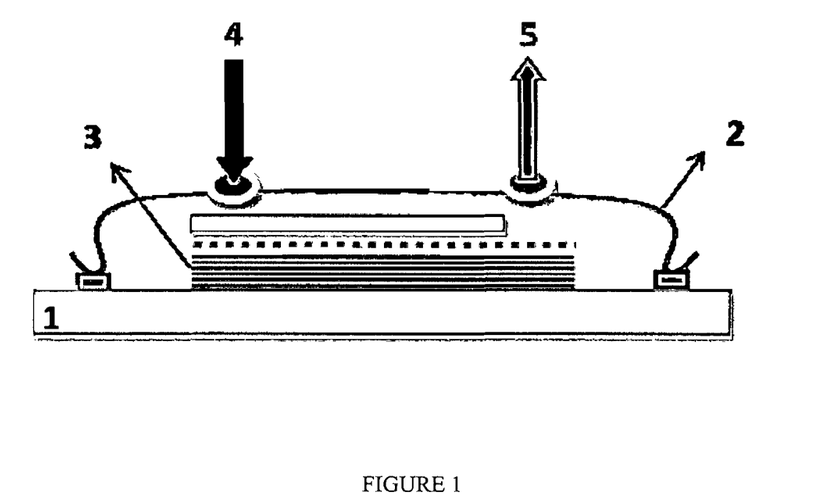
FIG. 1 illustrates a schematic depiction of a conventional Vacuum Assisted Resin Transfer Molding Process.

For the preparation of composite structures, Unidirectional E-glass fabric (RUBAN 8033) with 500 gsm areal density was used as reinforcing material with >99% fibers oriented in warp direction. The composite structure comprising the thermoset formulation of example-1 reinforced with unidirectional fabric was prepared by employing VARTM process (refer to FIG. 1 of the accompanying drawings). In this process, layers of unidirectional fabrics (3) are stacked on a mould (1) and sealed with vacuum bagging (2). Afterwards, the thermoset formulation was infused (resin inlet 4) through the stacked layers of unidirectional fabrics under vacuum (5). The stack of unidirectional fabrics infused with the thermoset resin formulation was cured to obtain a composite structure. Afterwards, the structure was demolded. Structural integrity, which is essential as far as the fabrication of large structures is concerned, was confirmed. Further, the composite was subjected to post curing at 120° C. for 8 hrs resulting a mechanically robust structure.

Figure 4:
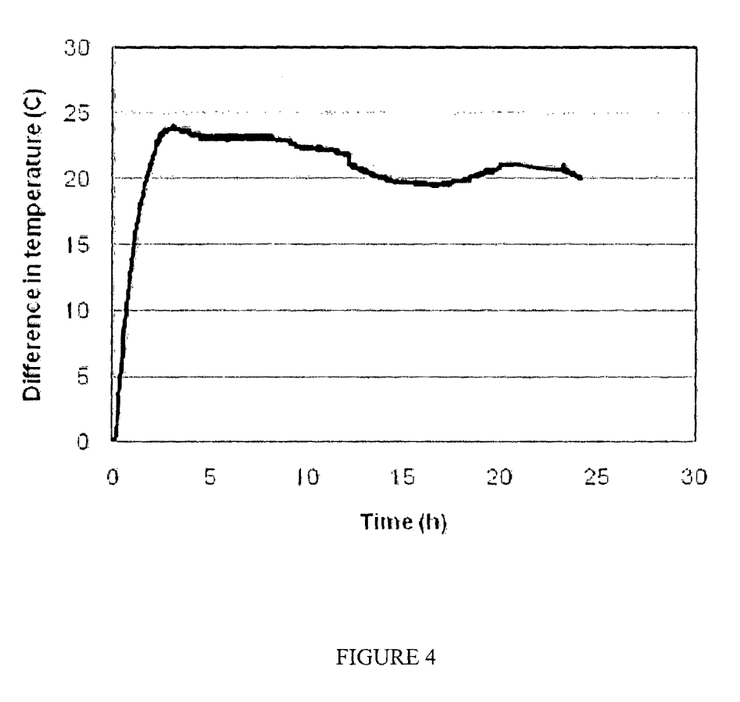
FIG. 4 illustrates the difference in temperature as a measure of the evolved exotherm with time while preparing composite laminates, in accordance with the present disclosure.

The amount of heat generated from the composite during the cure reaction at 40° C. was recorded by means of embedded sensors. The difference in temperature with time, which is a direct measure of the exotherm, was found to be negligible (refer to FIG. 4 of the accompanying drawings). The initial hike in the temperature difference was only due to the attainment of the set temperature (from ambient to 40° C.). This observation is rather very promising and can have widespread implications. One of the most critical issues i.e., the evolution of tremendous amount of heat, which remains challenging in conventional epoxy resin formulations especially while dealing with bulk quantities thus concluded to be solved in the present disclosure.

Mechanical properties of the composite laminates fabricated using the thermoset resin formulation of the present disclosure (example-1) was found to be sufficient for load bearing engineering structures. The tensile and compressive properties of laminates where unidirectional E-glass and carbon fabric were used as reinforcement component are given below in Table-2. It is promising to note that the mechanical properties are either comparable or superior to the ones fabricated using commercially available resin formulations.

TABLE 2

Mechanical properties of composite laminates

| Fabric type | Tensile strength (MPa) | Compressive strength (MPa) |
|---|---|---|
| UD Carbon-T700 | 2217.5 ± 50.1 | 849 ± 25.8 |
| UD E-Glass-Ruban 8033/1F | 1241.3 ± 22.5 | 583.1 ± 35.8 |

Tensile and compression properties of the composite laminates were determined according to ASTM D 3039 and ASTM D 3410 respectively. A properly calibrated test machine (Servo hydraulic UTM, BiSS, India) was used for testing at a cross head speed of 1 mm/min in a displacement control mode. Data reported are the average of at least ten measurements.

Fiber, resin and void volume fractions of composite specimens were determined as per ASTM D3171. The matrix portion of the specimen of known mass is removed in hot $HNO_3$ by digesting at 80° C. for 8 h (for carbon fiber composites) or burnt in a furnace at 600° C. for 6 h (for glass fiber composites). In the former method, the residue after digestion is filtered, washed, dried, cooled and weighed. The weight percent of the reinforcement is calculated. For the latter, the residue after burning is cooled and weighed from which the weight percent of the reinforcement is calculated. Knowing the densities of the composite and the reinforcement, the volume percent is calculated and in turn the void volume.

Comparative Example

In this example, the reactivity profile of the thermoset resin formulation of the present disclosure (in accordance with example-1) is compared with the reactivity profile of a commercial resin formulation.

Figure 5:
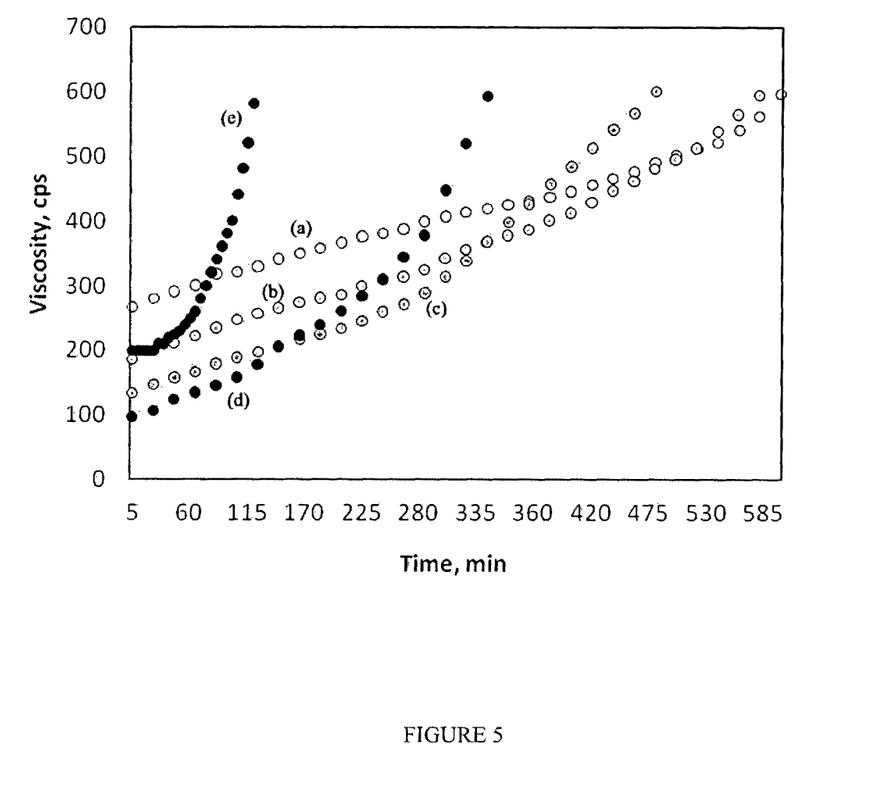
FIG. 5 illustrates a comparative analysis of the reactivity profile of the thermoset resin formulation of the present disclosure at, (a) 25° C., (b) 30° C., (c) 35° C. and (d) 40° C. with that of a commercial formulation at 25° C. (e).

For the comparative analysis, the viscosity profile of the present thermoset resin formulation at 25° C., 30° C., 35° C., and 40° C. and viscosity profile of the commercial resin formulation at 25° C. is illustrated in FIG. 5 of the accompanying drawings. It is evidenced from the accompanying drawing that slop of the viscosity vs time plot of the thermoset resin formulation of the present disclosure (at 25° C.) remains unaltered as compared to the plot of the commercial resin formulation (25° C.) which shows a sudden and a sharp increase in the viscosity of the commercial resin formulation even in the initial hours. This comparison hence makes it evident that the limitations of commercial formulations are alleviated and that too over a broad range of composite processing temperature conditions with a prolonged reactivity.

The optimized thermoset resin formulation of the present disclosure offer an ideal matrix formulation for the composites to be fabricated by Vacuum Assisted Resin Transfer Molding (VARTM). It offers an adequate viscosity, required trend in reactivity, ideal gelation conditions, to be commercialized for the infusion of large and thick composite structures, the viability of which has been experimented on a small scale structural component.

Technical Advantages

The present invention related to a thermoset resin formulation and composite structures derived from said thermoset resin formulation have the following technical advantages:
(1) low viscosity;
(2) slow reactivity profile;
(3) high glass transition temperature;
(4) optimized curing/post curing conditions; and
(5) high mechanical properties.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A thermoset resin formulation for the manufacture of large and thick composite structures; said formulation consisting essentially of:
    (i) at least one liquid epoxy resin present in a weight proportion varying between 50 parts to 70 parts;
    (ii) at least one di-amine hardening agent present in a weight proportion varying between 21 phr to 29 phr and selected from the group consisting of isophorone diamine, 2,2'-dimethyl-4,4'-methylene bis(cyclohexyl amine), and diethyl toluene diamine;
    (iii) at least one low molecular weight epoxy diluent, other than the at least one liquid epoxy resin, present in a weight proportion varying in the range of 10 phr to 40 phr; and
    (iv) N,N-dimethylaminopropylamine, as an accelerator, present in a weight proportion varying between 0.5 phr to 3.0 phr; and
    wherein the thermoset resin formulation: has a viscosity suitable for vacuum assisted resin transfer molding; exhibits unchanged reactivity within a temperature range of 25° C. to 40° C.; and exhibits a negligible exotherm during a curing reaction at 40° C.

2. The thermoset resin formulation as claimed in claim 1, wherein the at least one liquid epoxy resin is Diglycidyl ether of Bisphenol-A epoxy resin having viscosity varying between 9500 to 12500 cps, at 25° C. and density varying in the range of 1.1 g/cm$^3$ to 1.2 g/cm$^3$.

3. The thermoset resin formulation as claimed in claim 1, wherein the at least one liquid epoxy resin is present in a weight proportion of 60 parts.

4. The thermoset resin formulation as claimed in claim 1, wherein the at least one di-amine hardening agent is present in a weight proportion of 23 phr.

5. The thermoset resin formulation as claimed in claim 1, wherein the at least one low molecular weight epoxy diluent is selected from the group consisting of diglycidyl ether of butane diol, diglycidyl ether of hexane diol, and epoxidised cashew nut shell liquid.

6. The thermoset resin formulation as claimed in claim 5, wherein the at least one low molecular weight epoxy diluent is diglycidyl ether of butane diol.

7. The thermoset resin formulation as claimed in claim 1, wherein the at least one low molecular weight epoxy diluent is present in a weight proportion of 40 phr.

8. The thermoset resin formulation as claimed in claim 1, wherein the accelerator is present in a weight proportion of 1.1 phr.

9. The thermoset resin formulation as claimed in claim 1 is characterized by having a viscosity of about 260 cps at 25° C. and a glass transition temperature, when cured, of 104° C.

10. A composite structure comprising 40 wt % to 50 wt % of a cured matrix resin and 60 wt % to 50 wt % of at least one reinforcing agent, wherein the cured matrix resin is a cured product of the thermoset resin formulation as claimed in claim 1.

11. The composite structure as claimed in claim 10, wherein the at least one reinforcing agent is a unidirectional fabric selected from the group of fabrics consisting of E-glass fiber, carbon fiber and any combinations thereof.

12. A process for manufacturing the composite structure as claimed in claim 10, said process comprising the following steps;
    i. stacking layers of the at least one reinforcing agent on a mould and sealing with vacuum;
    ii. infusing the thermoset resin formulation through the stacked layers of reinforcing agent under vacuum; and
    iii. curing the stacked layers infused with the thermoset resin formulation at a temperature varying between 25 to 45° C. for a time period of about 24 hours, followed by post curing at a temperature of 120° C. for a time period of about 8 hours to obtain the composite structure.

* * * * *